April 12, 1966 A. H. FRENTROP 3,246,191
NEUTRON GENERATING DISCHARGE TUBE
Filed March 23, 1961 6 Sheets-Sheet 2
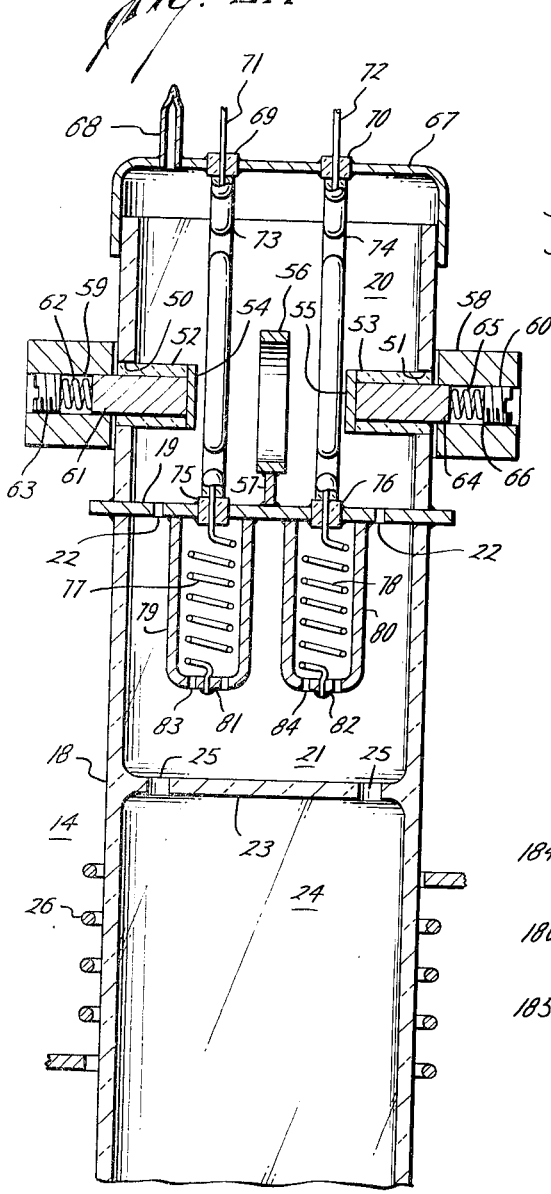
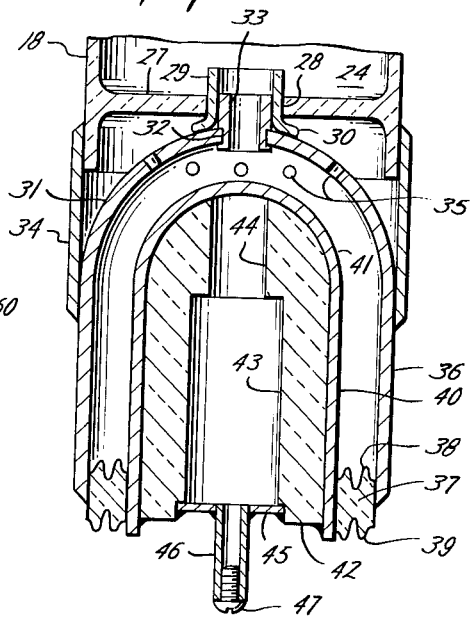
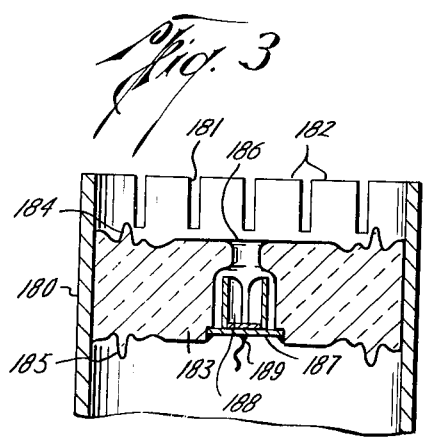
Arthur H. Frentrop
INVENTOR.
BY William R. Sherman
ATTORNEY April 12, 1966 A. H. FRENTROP 3,246,191
NEUTRON GENERATING DISCHARGE TUBE
Filed March 23, 1961 6 Sheets-Sheet 3

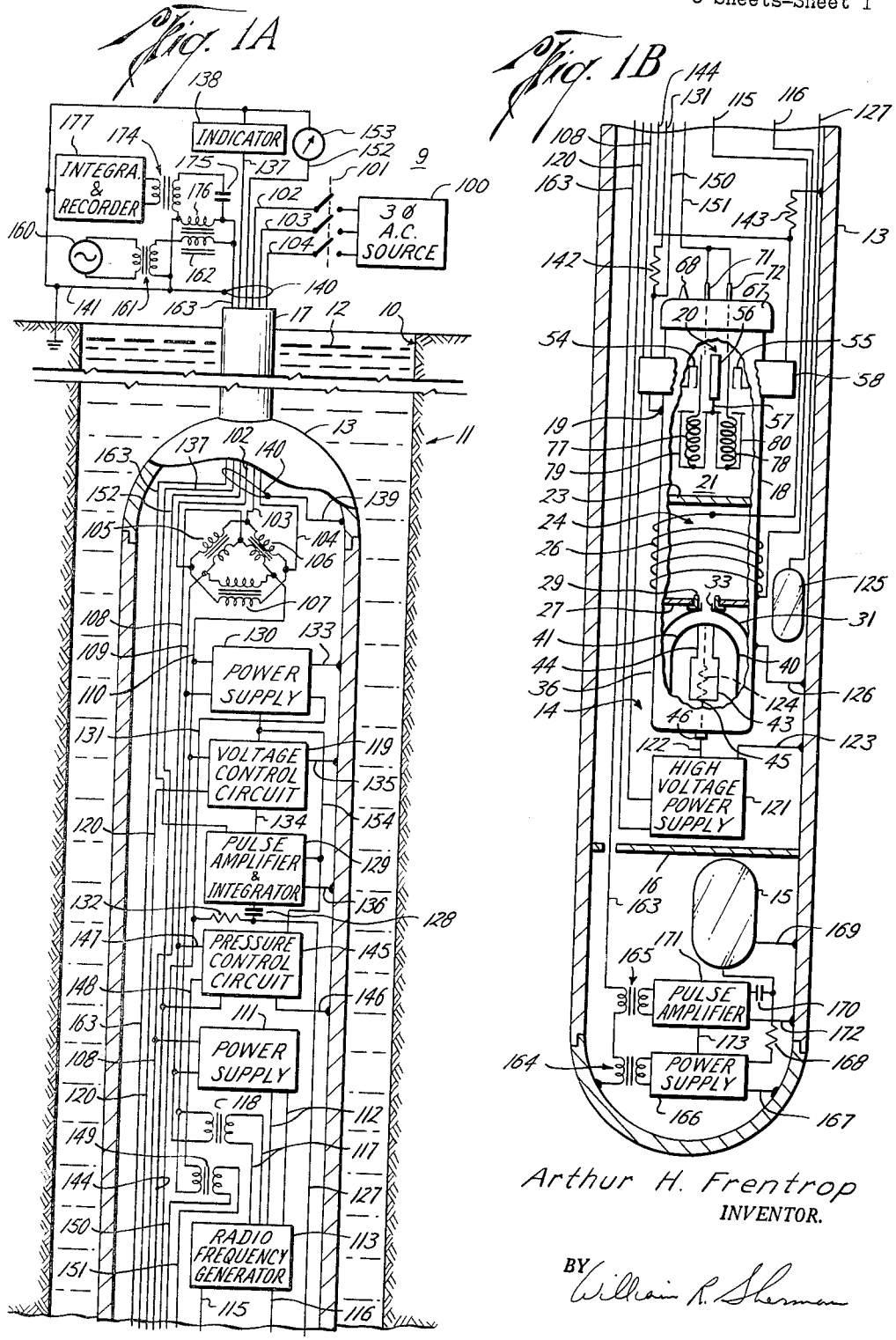

Arthur H. Frentrop
INVENTOR.

BY William R. Sherman

ATTORNEY

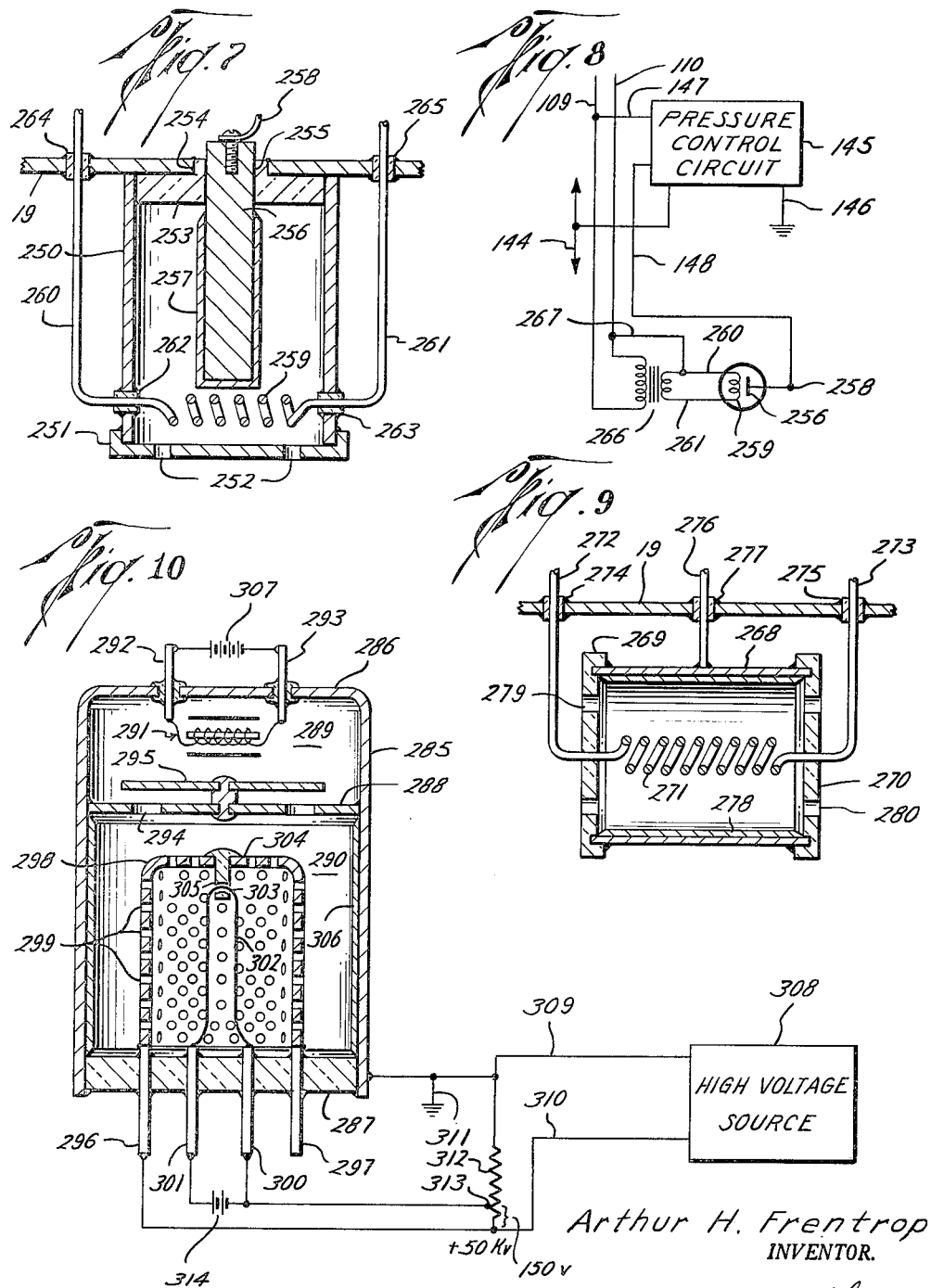

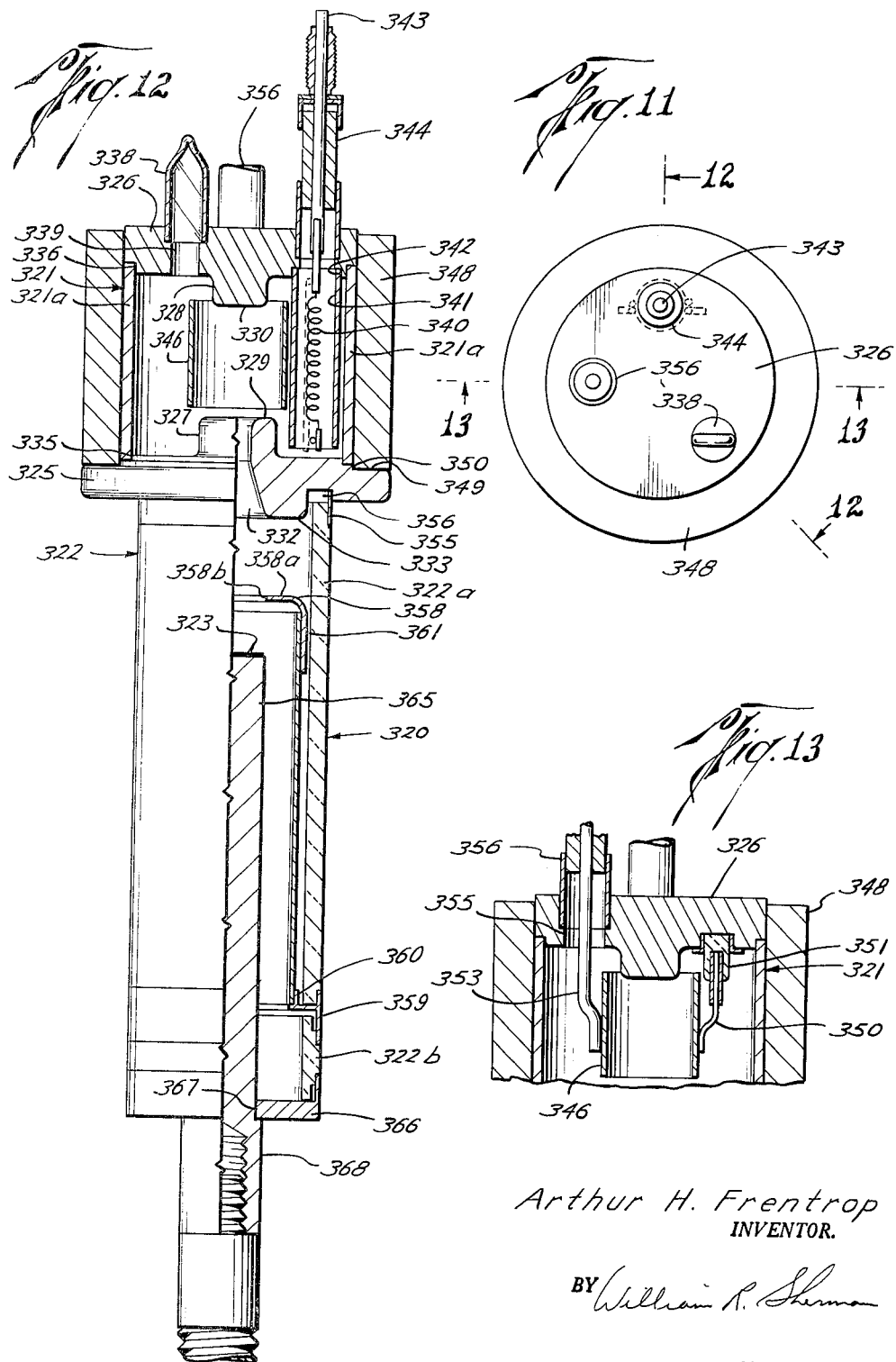

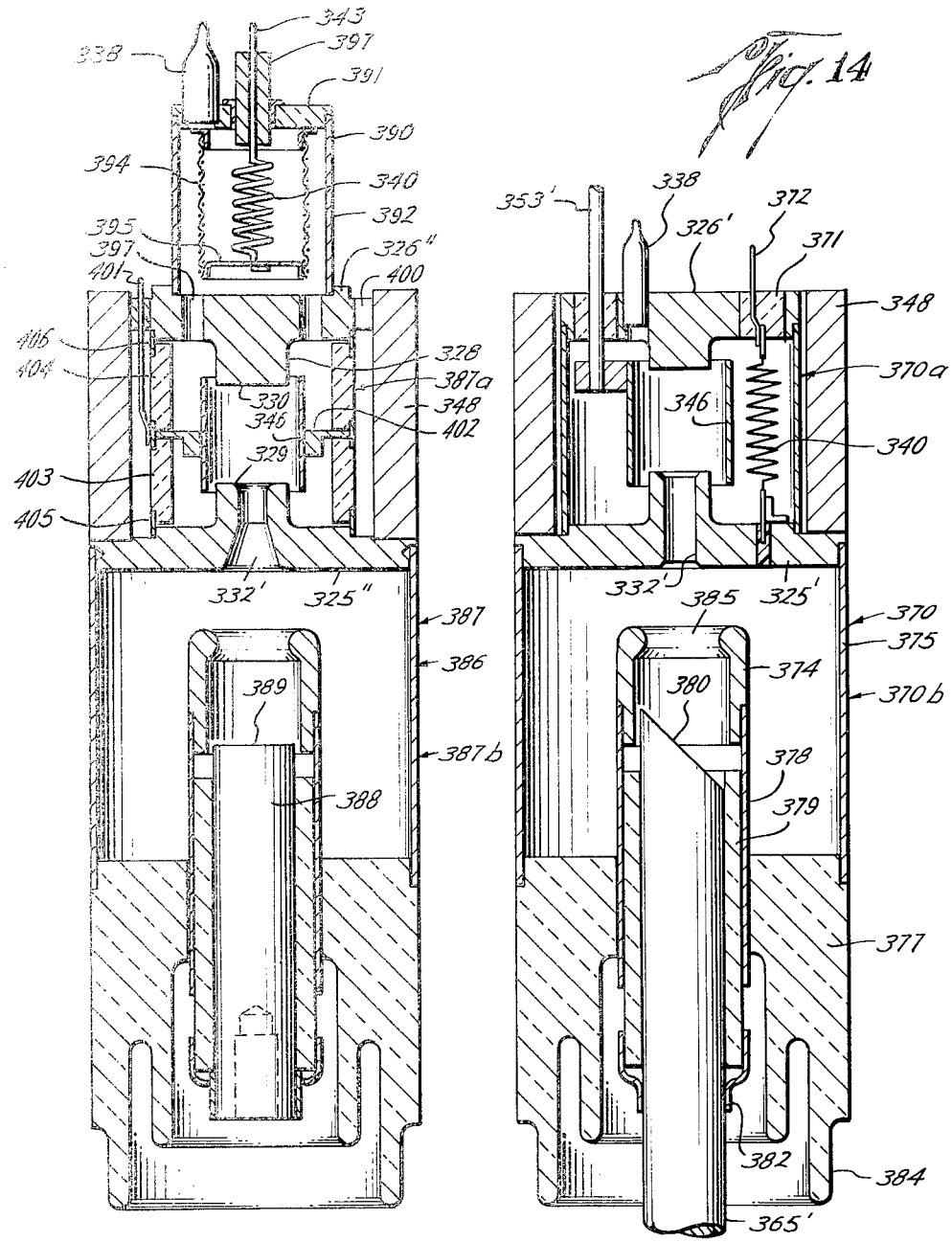

United States Patent Office 3,246,191
Patented Apr. 12, 1966

3,246,191
NEUTRON GENERATING DISCHARGE TUBE
Arthur H. Frentrop, Ridgefield, Conn., assignor to Schlumberger Well Surveying Corporation, Houston, Tex., a corporation of Texas
Filed Mar. 23, 1961, Ser. No. 97,792
14 Claims. (Cl. 313—61)

This invention relates to neutron generating systems and more particularly pertains to a new and improved neutron generator especially adapted to traverse the narrow confines of a well or borehole, although useful in a variety of other applications. Since a neutron generator embodying the invention is ideally suited to the needs of well logging service, it will be described in that connection.

This application is a continuation-in-part of applicant's pending application Serial No. 414,839, filed March 8, 1954, now Patent No. 2,983,820, granted May 9, 1961.

It has been proposed heretofore that a generator of high energy neutrons be employed in neutron-gamma ray or in neutron-neutron logging. As contrasted with a radium-beryllium source conventionally utilized for such logging, a neutron generator may feature a negligible amount of radiation other than the desired neutrons, a higher yield of neutrons, a controllable yield of neutrons, neutrons at higher energies than formerly possible, mono-energetic neutrons and control of the generator so as to permit its deactivation prior to withdrawal from a well. The first five of these attributes are important in obtaining more informative logs, while the last is valuable in minimizing health hazards to operating personnel.

In general, prior neutron generators were only suited for laboratory use and were not designed to meet the severe requirements imposed on well logging equipment. Thus, presently available neutron generators are much too large to be passed through a borehole. The components are not adaptable to the source-detector spacing requirements of well logging. Moreover, these neutron generators are too critical in their operation and too fragile for logging service.

It is, therefore, a primary object of the present invention to provide an improved neutron generator which meets the requirements of logging service.

A particular object of the present invention is to provide an improved neutron generator which is small enough in diameter to permit its introduction into a typical cased or uncased deep well, and short enough in length for convenient source-detector spacings.

Another object of the present invention is to provide an improved neutron generator which may be reliably operated during a logging run to produce a maximum yield of neutron flux with efficient use of power supplies and without requiring critical or continuous operating adjustments.

An additional object of the present invention is to provide an improved neutron generator which may be reliably operated at high voltages as well as at the high ambient temperatures encountered at depth in logging operations yet free from the effects of external magnetic fields or circuits such as may be presented by a deep well pressure housing or the like.

Yet another object of the present invention is to provide an improved neutron generator that is readily assembled, and rugged enough to operate efficiently and reliably although subjected to the severe physical shocks usually imposed on logging apparatus during transport to and from a well location as well as during a logging run.

Still a further object of the present invention is to provide a gaseous discharge device or the like providing a compact and efficient arrangement for ionizing a gas.

These and other objects of the present invention are obtained by providing a neutron generator comprised of an ion source, an ion accelerator and a target which preferably may be an element of the accelerator. The target includes a substance adapted to react with bombarding ions of sufficient velocity to produce neutrons.

As specifically disclosed in the aforementioned parent application Serial No. 414,839, the generator comprises an envelope containing a gas such as deuterium. A source of such gas is conveniently provided within the envelope, and provision is made for regulating the gas pressure. In the ion source section of the envelope, a field is established tending to cause electrons therein to traverse elongated circular paths for efficient production of positive ions. A probe of the accelerator, which effectively reaches into the region of the ion source, removes positive ions from the source and a suitably high potential difference is impressed between the probe and the target so that these positive ions are accelerated to the required high velocity prior to striking the target. The target includes a material containing tritium, an isotope of hydrogen. From the resulting deuterium-tritium reactions, neutrons are derived.

In a particular embodiment, means are provided for replenishing tritium in the target. To this end, the target is constructed of the material through which tritium ions may diffuse and is arranged to enclose and form one electrode of an electrolytic cell. The electrolyte is arranged so that tritium ions are formed in solution and by applying an electric potential between the first-mentioned electrode and another electrode of the cell, ionic migration is caused to occur. By suitably arranging the polarity of the applied potential, tritium collects at the first-mentioned electrode in ionic form and diffuses through the target material so that it is exposed to incident deuterium ions which are accelerated toward the target.

Alternatively, the neutron generator may comprise an electron-emitting filament or cathode surrounded by a perforated electrode. The cathode and perforated electrode are suitably energized to achieve an ionic discharge for producing deuterium ions. The perforated electrode effectively functions as a probe and is surrounded by a tritium-containing target and a potential for accelerating positive ions is applied to the accelerating gap defined by the probe and the target.

The apparatus may further include a pressure-control system for maintaining the pressure of deuterium gas in the ion source at a preselected value despite the fact that ions of the gas are continuously withdrawn. For this purpose, a pressure transducer may be associated with the ion source for deriving a pressure-control potential representing the gas pressure. This potential automatically adjusts the amount of gas issuing from a deuterium supply associated with the ion source.

The pressure transducer may, for example, comprise a pressure discharge device located in a portion of the aforementioned envelope. A pair of diametrically-opposed tubes extend through the envelope and are terminated by spaced, parallel cathode plates. Each tube receives a bar magnet to provide a magnetic field oriented transversely to the cathode plates. This field effectively increases the path for electrons traveling between the cathode plates and an annular anode member supported between the plates. By suitably energizing the anode and cathode electrodes, a continuous ionic discharge occurs wherein the resulting anode-cathode current is dependent upon the pressure of the gas, and from this current, the aforementioned pressure control potential is derived.

In a similar manner, according to the present invention, the ion source may comprise a gaseous discharge device including a pair of electrically-conductive ferromagnetic cathodes sealed in oppositely disposed openings of a portion of the envelope with an annular anode electrode supported within the envelope between confronting surfaces of the cathode. A magnetic annulus surrounding the envelope may have its opposite ends disposed in flux linking relation to the respective cathodes so that an intense magnetic field is obtained in the region between the cathodes and within the anode electrode. Designating as the front cathode the one nearest the target, such front cathode preferably has a central bore defining portion which constitutes a probe through which the positive ions are withdrawn for acceleration toward the target.

Pressure within the envelope may be controlled by means of a filament-type deuterium source composed of a metal in which deuterium gas is occluded. In one form of the present invention, such filament-type deuterium source may be disposed in a portion of the envelope communicating with the region of the ion source between the confronting cathodes via apertures in the back cathode. In another form, such filament-type deuterium source is located in an annular region between the exterior of the anode and the surrounding portion of the envelope, preferably in close heat exchange relation with the envelope wall, and so arranged that the overall length of the neutron generator may be a minimum. Alternatively to the use of an occluding metal, a material in which deuterium is absorbed may be heated by a non-absorbent filament.

A modified deuterium source comprises an anode having a deuterium-absorbent surface. A filament or cathode is associated with the anode to constitute an electron discharge device whose anode-cathode current may be controlled. Accordingly, the anode dissipation may be adjusted and in this way the amount of deuterium gas which issues from the anode is regulated.

An alternative type of pressure control system comprises a deuterium source having a sufficient capacity to provide a pressure equilibrium. For example, at a given operating temperature, if the deuterium pressure within the envelope drops below a desired limit, the source emits deuterium; whereas, if the pressure increases above a given value, the source absorbs deuterium.

Because the neutron generator is a closed contiguous system, it is necessary to balance two opposing requirements. The gas pressure in the ion source must be high enough to allow sufficient ionization to be produced in each to give adequate ion currents for their operation. However, the gas pressure must be low enough to avoid appreciable production of ionization in the accelerating gap. A stable balance may be achieved by constructing these two components so that the ratio of total travel path to mean-free-path for electrons in the ion source is large compared to the ratio of total travel path to mean-free-path for electrons in the accelerating gap.

As used herein, the term "mean-free-path" denotes the average distance that electrons travel in a particular gas between collisions with atoms or ions of that gas. If a sufficient number of such collisions take place, the ionization produced is cumulative, resulting in a continuous ionic discharge.

The spacing between electrodes of the accelerating gap is made small enough to minimize the total path traveled by electrons and ions in this region. In this way, ionization is inhibited despite the extremely high acceleration potential applied to the gap.

The arrangement in the ion source is such that the total path of travel of electrons is long enough to assure the occurrence of strong ionization. This is accomplished by providing an envelope diameter for the ion source that is large enough to permit electrons which traverse circular paths due to the applied fields to travel distances longer than the mean-free-path. For ease of manufacture, ruggedness and resistance to high-voltage breakdown and high temperature effects, the invention further comprehends a neutron generator having an envelope with ceramic and metallic portions assembled in sealed relation in one form defining a substantially hemispherically shaped accelerating gap and in another, a gap between substantially planar, parallel electrode faces. In each such form, the envelope of the neutron generator has a cylindrical profile with a diameter not exceeded by the annular magnetic annulus cooperating with the ferromagnetic cathodes of the ion source to provide a magnetic field within the anode.

The novel features of the present invention are set forth with particularity in the appended claims. The present invention, both as to its organization and manner of operation, together with further objects and advantages thereof, may best be understood by reference to the following description taken in connection with the accompanying drawings in which:

FIGS. 1A and 1B illustrate schematically the upper and lower portions, respectively, of one embodiment of neutron well logging apparatus;

FIGS. 2A and 2B represent in longitudinal section the upper and lower portions of the neutron generator shown in FIG. 1B, but drawn to an enlarged scale;

FIG. 3 is a view in longitudinal section of a mounting socket which may be used for supporting the neutron generator of FIGS. 2A and 2B;

FIG. 7 is a view in longitudinal section of another type of deuterium source;

FIG. 8 is a schematic diagram of an electrical circuit in which the deuterium source of FIG. 9 may be used;

FIG. 9 is a view in longitudinal section of another embodiment of the deuterium source shown in FIG. 9;

FIG. 10 is a view in longitudinal section of a neutron generator suitable for use in the apparatus of FIG. 1B;

FIG. 11 is a top view of another neutron generator suitable for use in the apparatus of FIG. 1B and constructed in accordance with the present invention;

FIG. 12 is a partial sectional view taken along the line 12—12 in FIG. 11 illustrating more fully the features of such neutron generator;

FIG. 13 is a sectional view of such neutron generator taken along the line 13—13 of FIG. 11;

FIG. 14 is a view in longitudinal section of another neutron generator constructed in accordance with the present invention; and FIG. 15 is a view in longitudinal section of yet another neutron generator constructed in accordance with the present invention and having a separate gas source section.

Figure 4:
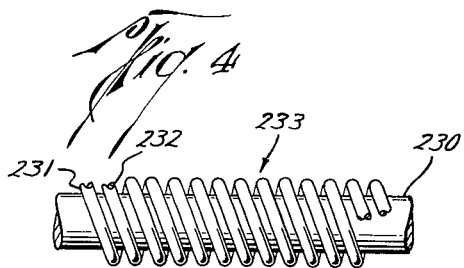
FIGS. 4 and 5 are perspective views of progressive stages in the fabrication of the deuterium-emitting filaments shown in FIG. 2A.

In FIG. 1A of the drawings, neutron well logging apparatus is shown disposed in a borehole 10 traversing a plurality of earth formations 11. Borehole 10 usually contains a hydrogenous drilling liquid 12, such as water base or oil base mud, and it may be lined with one or more strings of metallic casing (not shown) or it may be uncased as illustrated.

The neutron well logging apparatus may comprise a pressure-resistant housing 13 enclosing a neutron generator 14 (FIG. 1B), a radioactivity responsive device 15 for detecting the phenomena to be observed, and asssociated electronic equipment required for proper operation of the neutron generator and the detector, as described in greater detail hereinafter.

A shield plate 16, disposed above detector 15, may be employed to shield the detector from radiation emanating from generator 14. If the apparatus is to be used for obtaining neutron-gamma ray logs, the shield may be composed of lead, and if neutron-neutron logs are desired, the shield may be constructed of boron carbide. Of course, a composite shield of lead and boron carbide may be utilized if both types of logs are to be made with the equipment, either successively or simultaneously.

Housing 13 is suspended in the borehole by means of an armored cable 17 which, in connection with a winch (not shown) located at the surface of the earth, is utilized to lower and raise the apparatus in the borehole in the customary manner. As will be described later in detail, cable 17 comprises a plurality of insulated conductors that electrically connect the apparatus within housing 13 with surface equipment 9.

The neutron generator 14 (FIG. 1B) is suitably supported by a conventional shock mounting (not shown) within housing 13. The generator comprises an evacuated envelope 18, preferably constructed of an out-gassed ceramic material, such as a magnesium silicate compound, and filled with deuterium gas under a selected pressure which may be in the neighborhood of 1 to 10 microns of mercury.

As best seen in FIG. 2A, a metal disc 19, preferably composed of an alloy of chromium and iron, usually referred to as chrome-steel, having a temperature cofficient of expansion which substantially matches that of the ceramic material in envelope 18, divides the upper portion of the envelope into a pressure gauge section 20 and a deuterium source section 21. These sections will be described more fully hereinafter.

The portions of envelope 18 adjacent disc 19 are suitably fused or otherwise sealed to the disc so as to maintain the envelope gas-tight, although sections or compartments 20 and 21 are in communication via a plurality of openings 22 which are distributed annularly about disc 19. For example, a metallic oxide may be fused to the metal disc and the ceramic envelope fused to the oxide in a known manner. Alternatively, a metallic hydride coating, such as zirconium hydride, may be fused to the ceramic and the disc silver-soldered to the coating. Of course, any well-known method may be employed to form this metal-to-ceramic seal as well as other similar seals to be referred to hereinafter.

Supported in spaced, parallel relation below disc 19 is a ceramic partition 23 which effectively separates compartment 21 from an ion source section or compartment 24. A plurality of openings 25 annularly distributed about partition 23 communicates compartments 21 and 24. To effect ionization of the deuterium gas, a radio-frequency coil 26 is wound about envelope 18 in the vicinity of section 24. The envelope has a diameter which is great enough so that electrons which traverse circular paths due to the field induced coil 26 travel distances longer than the mean-free-path, thereby to assure ionization.

As best seen in FIG. 2B, another ceramic partition 27 defines a lower extremity for ion source compartment 24 and is provided with a central opening 28 which receives a quartz sleeve 29 extending into compartment 24. The lower end of sleeve 29 is flared outwardly to form a skirt 30 which abuts against the outer surface of a hemispheric cap 31 constructed of chrome-steel. A central opening 32 in cap 31 receives a section of reduced diameter of a hollow aluminum probe 33, and the lower end of the probe is deformed so as to effect a physical and electrical connection with the cap. Probe 33 extends upwardly in coaxial relation with tube 29 and terminates below the upper end of the tube.

Hemispheric cap 31 has a diameter substantially equal to the diameter of the ceramic envelope 18 and the envelope is terminated above the cap. A concentric chrome-steel sleeve 34 snugly receives envelope 18 and cap 31. It is suitably fused about its upper periphery to envelope 18 and its lower periphery is soldered or welded to cap 31. To equalize the pressure on both sides of cap 31, it is provided with plurality of openings 35.

A cylindrical extension 36 extends downwardly from cap 31 and its lower extremity receives and is fused to a ceramic insulating ring 37 having upper and lower surfaces 38 and 39. These surfaces are provided with suitable grooves or other deformities arranged to increase the radial leak path distance between cylinder 36 and an inner metallic cylinder 40 whose lower end is snugly received by and is fused to ring 37. Cylinder 40 preferably is constructed of a metal through which tritium ions can diffuse, such as iron, although nickel, molybdenum or platinum may be used. It extends coaxially within cylinder 36 and its upper end is terminated by an integral hemispheric cap 41 disposed in spaced, concentric relation with respect to cap 31. Cap 41 forms a target for the neutron generator, and tube 33 and target 41 constitute an accelerating gap when suitably energized.

Obviously, the accelerating gap is exposed to the gas within envelope 18. To reduce the possibility of ionization of deuterium when the electrodes of the gap are energized for accelerating deuterium ions, the spacing between caps 31, 41 is made smaller than the mean-free-path of electrons traversing the envelope.

It should be noted that by reason of the hemispheric configuration of the caps 31 and 41, the possibility of ionization and breakdown is minimized as compared with other arrangements. This desirable result obtains since neither the products of sputtering nor electronic charges can collect on insulators in the high voltage accelerating region.

Member 40, 41 receives an electrical insulating material, such as ceramic insert 42, which conforms to the shape of the inner wall of member 40, 41. Insert 42 is sealed at its lower end to cylinder 40 and it is provided with an axial bore 43 having an upper section 44 of reduced diameter. A chrome-steel plate 45 is seated on a shoulder at the lower extremity of bore 43. This plate is suitably fused or sealed to insert 42 so as to retain an electrolyte which may be introduced via a metallic tube 46 that extends downwardly from the plate. A screw-plug 47 closes tube 46 after introduction of the electrolyte which may be composed of a weak solution of sulphuric acid or in the water is an isotope of atomic weight 3, known at tritium. However, both of these compounds may contain this isotope. In any event, tritium is present in an amount sufficient so that when the electrolytic cell including liquid within bore 43, 44 and electrodes 41 and 45 is suitably energized, tritium diffuses through the upper end of the wall of target 41.

If desired, a catalyst may be provided in the electrolytic cell to cause recombination of tritium and oxygen gases which may be formed as a result of the decomposition of tritium oxide under the influence of beta rays emanating from tritium during the operation of the generator. For example, finely divided platinum, commonly referred to as platinum black, may be utilized as such a catalyst.

As seen in FIG. 2A, the upper, pressure-gauge section 20 of envelope 18 is provided with a pair of diametrically-opposed openings 50 and 51 which receive ceramic tubes 52 and 53, respectively. The outer ends of sleeves 52 and 53 essentially conform to the outer cylindrical shape of envelope 18 and they are suitably sealed to the envelope. Their inner ends are closed by respective, metallic cathode plates 54 and 55 which are fused thereto. Thus, the envelope is maintained pressure tight and cathodes 54 and 55 are supported in spaced, parallel relation on opposite sides of an annular metallic anode ring 56 which is electrically and physically connected to disc 19 by a metallic support rod 57.

A ring 58 of magnetic material is received by envelope 18 and is provided with openings 59 and 60 that are aligned with the openings in tubes 52 and 53. A cylindrical bar magnet 61 is received by openings 59 and extends into sleeve 52. It is maintained in electrical contact with plate 54 by means of a compression spring 62 and a cooperating retaining screw 63 which is threaded into opening 59. Opening 60 and sleeve 53 are similarly provided with a bar magnet 64, and a compression spring 65 together with a retaining screw 66 maintains magnet 64 in contact with plate 55. The end poles of the magnets 61 and 64 which face one another are of opposite magnetic polarity so as to provide a magnetic field having a component transverse to cathode plates 54 and 55 and anode 56. Ring 58 provides a return path for this magnetic field and it is also employed as an electrical terminal for plates 54 and 55. The spacing between plates 54 and 55 and the strength of the magnetic field produced by magnets 61 and 64 are arranged in a known manner to assure the occurrence of a continuous ionic discharge in the pressure-gauge section 20.

The upper extremity of envelope 18 is closed by a cup-shaped header 67 constructed on chrome-steel fused or sealed to the envelope. The header is provided with an evacuation tube 68 and electrical insulating ceramic inserts 69 and 70 through which leads 71 and 72 may be introduced into the envelope while maintaining pressure-tight seals.

The portions of leads 71 and 72 extending through section 20 are enclosed by respective glass sleeves 73 and 74 and are suitably bent or shaped so as to pass to one side of the cylinder defined by annular electrode 56. Thus, as viewed in FIG. 2A, these leads pass behind the cylinder so defined. They extend through respective electrical insulating ceramic inserts 75 and 76 in disc 19 and are connected to the ends of helical filaments 77 and 78, respectively, which extend into envelope section 21. These filaments (to be described more particularly in connection with FIGS. 6 and 7) are composed of a metallic deuteride, such as zirconium deuteride, arranged so that the pressure over their surfaces increases or decreases with temperature. Thus, at a temperature in a first temperature range, deuterium gas is emitted, while at a temperature in a second temperature range, deuterium is absorbed. To conserve power, individual, tubular heat shields 79 and 80 constructed of a reflective material of high melting point, such as tantalum or molybdenum, enclose filaments 77 and 78. The upper ends of shields 79 and 80 are soldered or welded to disc 19 and the lower ends are provided with respective closures 81 and 82 to which the lower extremities of filaments 77 and 78, respectively, are attached. Openings 83 and 84 in shields 79 and 80 communicate the compartments defined by the heat shields with compartment 21.

In constructing generator 14, the usual precautions observed in fabrication of discharge devices are observed. For example, metal materials for the various electrodes are selected so that there is relative freedom from gases that may be absorbed prior to or during the fabrication process and which may be later expelled in operation to contaminate the generator. Moreover, with the exception of the electrodes 54 and 55 of pressure gauge 20, which should be constructed of a metal that is a good secondary electron emitter, electrode metals may be selected on the basis of low secondary-electron emission characteristics to minimize the possibility of breakdown. The original outgassing is accomplished via evacuation tube 68 over which the required amount of deuterium is then introduced before it is sealed.

Referring now to FIG. 1A, in order to provide power for operating generator 14 and its associated circuitry, and yet remain within the voltage and current-carrying capabilities of the conductors in cable 17, power is supplied by a three-phase alternating current source 100 located at the surface of the earth. For example, the source may provide 600 volts at 400 cycles at each of its phases supplied via a three-pole, single-throw switch 101 and cable conductors 102, 103 and 104 to delta-connected step-down transformers 105, 106 and 107 mounted within housing 13. By utilizing transformers having a suitable step-down ratio, there is thus available at conductors 108, 109 and 110 a three-phase supply at 115 volts.

One phase of the supply current is applied over conductors 108, 109 to a conventional power supply 111 adapted to convert the applied alternating voltage to a higher unidirectional potential. The latter potential is supplied over conductors 112 to the anode circuit (not shown) of a radiofrequency generator 113 operating at a frequency in the range from 10 to 100 megacycles (mc.) per second. The radiofrequency source, in turn, is connected by conductors 115 and 116 to the end terminals of coil 26 (FIG. 1B) which is associated with ion source 24. Filament power for the radiofrequency generator 113 is supplied over leads 117 by a step-down transformer 118 energized from another phase of the supply current available at conductors 109 and 110.

The remaining phase of supply current, available at leads 108 and 110, is fed via a voltage control circuit 119 (to be described more fully hereinafter) and lead 120 to a high voltage power supply 121 which may be of conventional construction. The power supply 121 may be of conventional construction or may be of the specific type described in the co-pending application of Wayne R. Arnold (deceased) filed November 12, 1958, bearing Serial No. 777,169, now Patent No. 3,061,728, issued October 30, 1962, the parent application of which was issued on November 24, 1959, as Patent No. 2,914,677. It provides a unidirectional potential between output leads 122 and 123 in the neighborhood of 100 kilovolts. Lead 123 is the positive terminal of the supply and is grounded to the housing 13, while lead 122, the negative terminal, is connected to metallic tube 46. As pointed out in connection with FIG. 2B, tube 46 is connected to metallic disc 45 and the disc, in turn, is connected to target 41 through the impedance of the electrolyte within bore 43, 44, represented in FIG. 1B schematically with a resistor 124 shown in dash outline. The accelerating gap circuit is completed by a connection 126 between probe member 31, 33, 36 and housing 13.

In order to control the neutron flux produced by generator 14, a detector in the form of a proportional counter tube 125 is disposed in housing 13 in the general vicinity of target electrode 41. The detector includes a hydrogen-fired zirconium envelope and is filled with argon gas plus a suitable impurity. Of course, other metals, such as titanium or tantalum, may be utilized as an envelope. Alternatively, the hydrogen-fired metal may be coated on the inner surface of a glass or ceramic envelope, or a ceramic envelope may be loaded with the required metallic hydride. One output lead of tube 125 is grounded to housing 13 and the remaining output lead is connected by a lead 127 to a coupling condenser 128 (FIG. 1A), in turn, connected to a conventional pulse amplifier and integrator unit 129. The necessary voltage for counter tube 125 is supplied by a conventional power supply 130, energized from power leads 109 and 110, over a lead 131 and a decoupling resistor 132. The power supply circuit is completed by a connection 133 to housing 13.

The output of unit 129, which is representative of a characteristic of the generated neutron flux, such as counts per unit time, is applied to the input circuit of a voltage control circuit 119 over a lead 134 and connections 135 and 136 to housing 13. Circuit 119 may be of conventional construction; for instance it may include a magnetic amplifier connected in a servo circuit which compares the potential from amplifier-integrator 129 with a reference potential to derive a control effect. This control effect may be the adjustment of the value of an impedance effectively connected between leads 110 and 120. Accordingly, the potential which energizes high voltage power supply 121 is dependent upon the generated neutron flux so that this flux is automatically maintained at a substantially constant value.

Amplified pulses from unit 129 are supplied via a conductor 137 which extends through cable 17 to an indicator 138, such as an integrator-voltmeter, of surface at the surfaces of metal disc 19 and metal shields 79 and 80 of compartment 21.

High energy neutrons emanating from target 41 irradiate formations 11 as well as detector 125. A small fraction of the fast neutrons incident on the detector produce recoil protons in its hydrogenous lining. Some of these protons cause ionization in the argon and the resulting pulses are amplified and integrated in stage 129 to develop a control potential supplied to voltage control circuit 119. If the neutron flux increases, the number of counts per second increases and the voltage control circuit reduces the voltage supply to high voltage power supply 121. Accordingly, a lower voltage is applied to the accelerating gap, thereby decreasing the neutron flux. Conversely, a decrease in the neutron flux causes an increase in the high voltage supply to the accelerating gap. In this way, the neutron yield remains substantially constant over a wide variety of operating conditions.

This type of neutron yield control is described in the aforementioned patent of Wayne R. Arnold, No. 2,914,677.

In the pressure control system, positive ions are created in the gap between magnets 61 and 64 by spiralling electrons which are emitted from cathodes 54 and 55 when positive ions strike these cathodes. Further electrons are emitted which, in turn, produce further positive ions and a continuous discharge occurs. The resulting current is a function of the gas pressure since that pressure determines the number of positive ions which can be produced. The potential developed across resistor 143 controls pressure control circuit 145 and thus the power that is supplied to filaments 77 and 78 is adjusted. Each filament may operate in a first temperature range of approximately 300° to 600° centigrade and control circuit 145 is arranged so that the filament temperature is increased when a decreased voltage at resistor 143 indicates a decrease in pressure within envelope 18. Conversely, the filament temperature decreases when the pressure in the envelope increases and pressure may thus be maintained constant at a desired value.

Pressure control circuit 145 further operates to provide a sufficient power to filaments 77 and 78 to bring them to an operating temperature in a second range of temperature below the first-mentioned range at which they absorb deuterium. Accordingly, an increase in pressure may be compensated and, upon a reduction in pressure, circuit 145 returns the filaments to their emitting temperatures.

The irradiation of the formations 11 by the high energy neutrons produced in generator 14 results in nuclear radiation that is incident on Geiger-Mueller tube 15. This occurs in a process wherein the neutrons are slowed to energy levels low enough to permit reactions producing capture gamma rays. The detector responds to gamma rays and its output is in the form of pulses which are amplified in stage 171 before being fed to the integrator and recording unit 177 of surface equipment 9. It is, therefore, apparent that a neutron-gamma ray log is obtained. This log features useful information regarding the earth formations traversed by the borehole, such as enumerated in detail in the co-pending application of Clark Goodman filed March 11, 1952, bearing Serial No. 275,932.

Since automatic controls are provided for the pressure and neutron flux, the neutron generator embodying the present invention may be reliably operated during an entire logging run. The operator need not be concerned with any critical and continuous adjustments to the equipment.

In general, by reason of the construction of generator 14, as evident in FIGS. 2A and 2B, a relatively rugged device is possible. Moreover, generator 14 has a configuration and is small enough so that it is adapted to the elongated, small-diameter, cylindrical housing suitable to be passed through conventional oil-field boreholes. The remainder of the borehole apparatus may be readily accommodated to the size and ruggedness specifications of borehole apparatus.

Of course, other types of logs may be derived. For example, detector tube 15 may be a proportional counter lined with hydrogenous material or a boron compound. In that way, a neutron-neutron log may be obtained. Moreover, by providing suitable detectors, both a neutron-gamma ray and a neutron-neutron log may be obtained simultaneously.

If desired, generator 14 may be pulsed and the detection system associated with tube 15 gated to achieve an activation log. For example, the power supply that provides the accelerating potential for generator 14 may be arranged to deliver the high voltage in pulses, rather than at a constant value. By pulsing the neutron generator, higher peak voltages may be employed without breakdown in the accelerating gap, as contrasted with the use of a steady voltage.

If desired, a pellet (not shown) of radioactive material, such as radium, may be associated with ion source 24 to assist the initiation of ionization of gas in the source.

While the sulphuric acid electrolyte has been suggested for use in chamber 43, 44 for generating tritium, obviously other suitable electrolytes may be employed for this purpose. For example, in order to preclude the build-up of gas pressure within the electrolytic cell during electrolysis, a mixture including water in which the hydrogen is the isotope tritium, sodium iodide, starch and a buffer consisting of boric acid plus sodium borate may be employed. The electrolysis of sodium iodide produces positive sodium ions at the cathode (of target 41) of the cell which reacts with the water to produce sodium hydroxide plus positive hydrogen ions. This hydrogen (tritium) migrates into the cathode and is transferred to the outer face for reaction with accelerated deuterium ions.

At the anode (plate 45), iodine is liberated and absorbed by the starch. The boric acid-sodium borate buffer reacts with the sodium hydroxide which is formed so that the solution is prevented from becoming too alkaline.

If desired, a shunt resistor may be placed in parallel with the cell, represented by resistor 124 in FIG. 1B. In that way, the generation and re-supply of tritium to the target may be adjusted so that it is proportional to a fixed fraction of the target current.

The relative diameters of bores 43 and 44 of the electrolytic cell are arranged to provide a required volume of electrolyte, while preventing the diffusion of tritium through unused portions of target 41. That is, bore 43 may be suitably large so as to accommodate the required volume of electrolyte, while bore 44 may be small enough so that tritium is diffused through the reatively small area of target 41 at which the ion beam impinges. Accordingly, substantially all of the tritium which is thus diffused enters into deuterium-tritium reactions.

In FIG. 3, there is illustrated a view in longitudinal cross section of a mounting socket suitable for use with the neutron generator just described. It comprises a cylindrical shell 180 having an inner diameter slightly larger than the outer diameter of cylinder 36 (FIG. 2B). Shell 180 is constructed of an electrically-conductive resilient material, such as an alloy of copper and tin commonly referred to as Phosphor bronze and its upper extremity is provided with a plurality of longitudinal slots 181 thereby to define a plurality of gripping fingers 182 suitable for frictionally and releasably receiving cylinder 36. A ceramic insulator 183 of generally disc-like configuration is supported coaxially within shell 180 and its upper surface 184 conforms to the configuration of the lower surface 39 of insulator 37 when the neutron generator is received by the socket of FIG. 3. Its lower surface 185 is similarly shaped so that the surface distances between shell 180 and a central opening 186 in insulator 183 is relatively large. Opening 186 has an equipment 9. The indicator circuit is completed by a connection 139 between housing 13 and shield 140 of the cable and a ground connection 141 at the earth's surface between the shield and the indicator 138.

In order to energize the pressure-measuring device in envelope section 20 (FIG. 1B), disc 19, to which anode 56 is connected, is connected to power supply 130 through a resistor 142 and an extension of lead 131. Magnet 58, which is connected to cathodes 54 and 55, is grounded to housing 13 by a resistor 143. The resistance value of resistor 143 is selected, in a known manner, to counteract the negative resistance characteristics of the glow discharge between anode 56 and cathodes 54 and 55 of the pressure gauge, as well as to derive a voltage representing anode-cathode current. Resistor 142 interposed in lead 131 is similarly employed to counteract the effect of the negative resistance of the ionic discharge which takes place in ion source 24.

The junction of resistor 143 with the lead to ring 58 is connected by a lead 144 to one input terminal of a pressure-control circuit 145, having its other input terminal connected by a lead 146 to housing 13. Circuit 145 may be of conventional construction comprising, for example, a magnetic servo amplifier for comparing the potential developed across resistor 143 with a reference potential to present an impedance between output circuit leads 147 and 148 that is automatically controlled by the difference between the developed and the reference potentials.

Lead 147 is connected to supply lead 109 and lead 148 is connected to one terminal of the primary winding of a stepdown transformer 149. The remaining primary terminal is connected to supply lead 110. The secondary winding of transformer 149 is connected by leads 150 and 151 to parallel-connected filaments 77 and 78 via disc 19 and leads 71 and 72.

Since the potential developed at resistor 143 is a measure of the pressure in envelope 18, this potential is also supplied by a cable conductor 152 to an indicator 153, such as a voltmeter, of surface equipment 9. If desired, a pressure-representing-potential derived in control circuit 145 may be utilized to actuate indicator 153.

Power supply 130 also provides a voltage for energizing units 119, 129 and 145. This voltage is supplied via a lead 154 and various extensions thereof.

The portion of the well-logging apparatus thus far described relates to the generation of neutrons for irradiating formation 11. In order to obtain a log, for example of the resulting gamma radiation, means are provided for energizing detector 15, which may be a Geiger-Mueller tube (FIG. 1B), and for recording a characteristic of its output. To this end, a source of alternating current 160 in surface equipment 9 is coupled to a transformer 161 having one terminal of its secondary winding connected to the grounded shield 140 and the other terminal connected via an isolating choke 162 to a conductor 163 of cable 17. Conductor 163 traverses housing 13 and is connected to the housing via the series-connected primary windings of transformers 164 and 165. Transformer 164 is a power transformer for a conventional power supply 166 having a connection 167 to housing 13.

Power supply 166 develops the high voltage for operating tube 15 which is applied thereto via an isolating resistor 168. The remaining terminal of tube 15 is connected by a lead 169 to housing 13. The junction of resistor 168 with the lead to tube 15 is connected by a coupling condenser 170 to the input circuit of a conventional pulse amplifier 171. The input circuit is completed by a connection 172 to the housing and a voltage of suitable magnitude for operating the amplifier is derived from power supply 166 over a lead 173. Transformer 165 is a pulse transformer to which the output signal of amplifier 171 is applied.

This output signal is derived at the surface equipment 9 by a pulse transformer 174. The primary winding of the transformer is connected to a filter including a series condenser 175 and a shunt choke 176 for attenuating voltages at the frequency of source 160. The transformer's secondary winding is connected to a conventional integrator and recording unit 177. Unit 177, for example, may comprise a capacitor for deriving a potential representing the number of pulses applied per unit time and a recording voltmeter to which this potential is applied. The recording medium of the voltmeter is displaced in a customary manner in synchronism with movement of the housing 13 through borehole 10 so that the continuous log may be obtained.

In operation, housing 13 is lowered into borehole 10 prior to the closing of switch 101. Thus, operating personnel are shielded from any dangerous radiation emanating from neutron generator 14 by the earth formations 11 and drilling fluid 12. With switch 101 closed, radiofrequency generator 113 is energized and its output is supplied to the coil 26 which is associated with ion source 24. In addition, high voltage power supply 121 delivers its output voltage to the accelerating gap defined by tube 33 and target 41. Moreover, a positive potential is supplied by source 130 to anode 56 relative to the cathodes 54 and 55 of the pressure gauge 20.

The radiofrequency current in coil 26 produces a radiofrequency field, and electrons traverse circular paths due to the potential gradient along each turn of the coil. The radiofrequency field has a sufficiently high amplitude so as to cause electrons to undergo ionizing collisions with molecules of the deuterium gas. Thus, deuterium ions are derived and, since the process is cumulative, a continuous ionic discharge occurs in the ion source.

Inasmuch as disc 19 and shields 79 and 80 are at a positive potential relative to probe 33, ions in source 24 tend to drift in toward the probe. Some of these ions pass through the opening in the probe and are thus introduced into the accelerating gap. Because of the high potential impressed between probe 31, 33 and the target 41, positive ions are accelerated to high velocities prior to striking the target. The highly accelerated positive deuterium ions thus react with the tritium in the target and neutrons of energies at a level of 14 million electron volts are generated.

The beam current in the accelerating gap flows through the electrolyte within chamber 43, 44 which is represented by resistor 124. By suitably apportioning the components of the electrolyte, the apparent resistance of resistor 124 is selected so as to produce a desired voltage difference between target 41 and plate 45. In other words, the current flow between electrodes 41 and 45 of the electrolytic cell is set at a predetermined value wherein electrolysis occurs and tritium ions migrate through the electrolyte toward the inner surface of target 41. Since the target is composed of a material through which such ions may diffuse, the tritium travels to the outer surface of the target wherein reactions with accelerated deuterium ions may occur. Accordingly, as neutron generator 14 operates, tritium for target 41 is continuously brought to the surface of the target and the generator may operate over extended periods of time while experiencing no material depletion in tritium.

Positive ions upon striking target 41 may produce secondary electrons which are accelerated across the accelerating gap in a direction opposite to positive ion travel. Most of these electrons pass through probe tube 33 and traverse source 24 without collision and eventually impinge upon partition 23 which absorbs their energies by conversion to heat which is dissipated. Moreover, since partition 23 is constructed of a ceramic material, usually of low atomic weight, only soft X-rays are produced by electron bombardment. It is thus evident that the accelerated electrons are prevented from undesirably causing localized heating of electrode metals in the generator and/or the occlusion of absorbed gases. In addition, partition 23 serves to minimize recombinations of electrons and ions annular shoulder at its lower end in which a conductive disc 187 is seated and secured. A connector or spring clip 188 is fixed to disc 187 and includes a plurality of conductive fingers which extend upwardly through opening 186. Clip 188 is positioned to receive tube 46 of the neutron generator and a lead 189 extends from dics 187.

In order to associate neutron generator 14 with the socket of FIG. 3, it is merely inserted into the socket and a mechanical, releasable connection is made between fingers 182 and the outer surface of cylinder 36. Thus, an electrical connection may be completed to cylinder 36 via shell 180. At the same time, tube 46 is received by clip 188.

With this socket construction, the high voltages which must be employed for the accelerating gap of neutron generator 14 may be safely accommodated without danger of breakdown. Of course, if desired, a suitable shock mounting may be provided for the socket shown in FIG. 3.

If desired, the generator of FIG. 2B may be modified in various ways. For example, a pair of deflection electrodes may be supported within envelope 18 for selectively deflecting the ion beam, as disclosed in H. B. Frey, Jr., Patent No. 2,769,096. Accordingly, the ion beam may be deflected so as to impinge on one-half of target 41 defined by a vertical reference plane, or on the other half. By utilizing a tritium hydride on one-half of the target and a deuterium hydride on the other half, the generator may be selectively operated to produce neutrons through deuterium-deuterium or deuterium-tritium reactions. Obviously, the generator may be controlled from the surface of the earth so as to yield one type of reaction or the other.

Alternatively, a pulse generator may be employed to switch the beam from one target section to the other while the gamma ray detector 15 (FIG. 1B) output is simultaneously gated. The arrangement may be such that + and — pulses respectively representing gamma radiation for the two types of reactions are supplied over conductor 153 to give both D—D and D–T yields.

Figure 5:
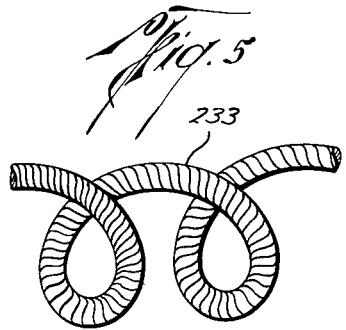

The deuterium-emitting filaments 77 and 78 of FIG. 2A may be constructed in the manner shown in FIGS. 4 and 5. On a wire core or support 230 of tungsten wire, a pair of wires 231 and 232 are wound in parallel, interspaced relation to one another to form a composite wire 233. Wire 231 may be tungsten or molybdenum and wire 232 may be an occluder metal such as zirconium. Of course, other occluders suitable for sorbing and desorbing hydrogen isotopes, may be used for wire 232 such as titanium, tantalum, or vanadium.

The composite filament wire 233 may be formed by twisting wires 230–232 about a central axis or it may be wound upon a mandrel to form the spiral shown in FIG. 5. Thereafter, the wire 233 may be heated in an atmosphere of hydrogen to a temperature of approximately 1000° centigrade to reorient and fix the crystalline structure of the metals, if desired. Next, wire 233 is placed in the envelope of the neutron generator and the envelope is evacuated. Filament 233 is then heated to a temperature above the melting point of zirconium wire 232 in order to outgas it thoroughly. Although in this condition the zirconium tends to flow, by reason of the spatial relationship of wires 231 and 232 the zirconium remains essentially in its initial position. Thereafter, the filament 233 may be alternately heated and cooled in the presence of successively introduced, preferably equal, quantities of deuterium and tritium, to effect hydriding of the same in sequence. Since it has been found that deuterium and tritium, if sorbed in succession, likewise are desorbed but in reverse succession, the neutron generator is, after being sealed off, preferably cycled again through alternate heating (to a higher temperature) and cooling to effect complete gaseous mixing of the isotopes and resorption, for substantially increased neutron flux yields in subsequent operation.

If desired, the filaments 77 and 78 of FIG. 2A, which are constructed of wire 233, may be mounted in heat shields 79 and 80 provided with an interior zirconium coating. In this way, the radiation shield simultaneously serves as a getter, as the filament operates as a source of hydrogen gas. Accordingly, improved gettering and generating characteristics of the filament and shield may be obtained, thereby to provide better control of the rate of change of envelope pressure with time.

Figure 6:
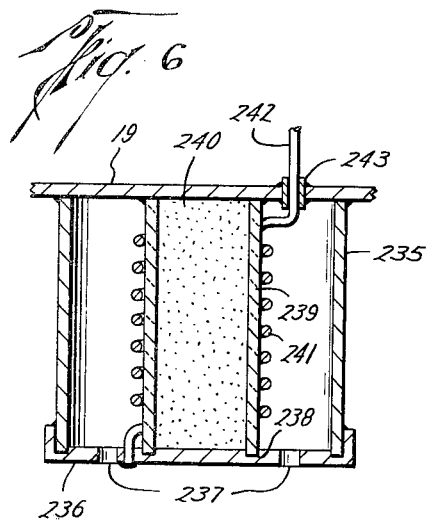
FIG. 6 represents a modified deuterium source such as may be employed in FIG. 2A.

An alternative type of deuterium source, illustrated in FIG. 6, may be mounted to disc 19 of the neutron generator illustrated in FIGS. 2A and 2B. A hollow, cylindrical heat shield 235 constructed of a highly reflective metal, such as molybdenum or nickel, is secured to the lower surface of disc 19. Shield 235 is terminated by a metallic cap 236 provided with a plurality of openings 237. An annular groove 238 in cap 236 receives one end of a hollow, cylindrical container 239 constructed of a refractory material, such as crushed, sintered quartz. Container 239 extends concentrically within heat shield 235 and terminates at the lower surface of disc 19 to which it is secured. The container is filled with powdered zirconium hydride 240 containing the isotope deuterium and a heater filament 241 is wound about its outer surface. The lower end of filament 241 is connected to cap 236 and the upper end is connected to a lead 242 which extends through a ceramic insulator 243 fixed within an opening in plate 19.

Alternatively, container 239 may be constructed of crushed, sintered stainless steel or nickel. In this event, an electrically insulating coating, such as refractory aluminum oxide, may be applied to the surface of filament 241.

In operation, a voltage is applied between plate 19 and lead 242, thereby to heat filament 241 to an operating temperature sufficient to bring powder 240 to a temperature at which deuterium is emitted. Filament 241 may be under the control of the pressure control circuit 145 of FIG. 1A so that automatic pressure control may be maintained within the envelope in which the modified deuterium source is mounted.

Alternatively, container 239 may be sufficiently large and filled with an occluder 240 having a large enough deuterium capacity, such as uranium deuteride, to provide a dissociation pressure in the desired pressure range. The voltage applied between lead 242 and plate 19 may be pre-set, or controlled in response to a thermostat positioned within container 239, so as to obtain an essentially constant operating temperature at which powder 240 absorbs excess deuterium in the envelope, while if the deuterium pressure within the envelope drops below a desired limit, powder 240 emits deuterium.

An electron discharge type deuterium source is illustrated in FIG. 7. It comprises a hollow, cylindrical heat shield 250 which is secured to the lower surface of plate 19 and terminated by a metallic cap 251 provided with a plurality of openings 252. A disc-shaped ceramic insulator 253 is disposed in the upper end of heat shield 250 and includes a section of reduced diameter which extends through an opening 254 in plate 19. Insulator 253 is provided with a central opening 255 through which a metallic anode 256 extends in coaxial relation with respect to heat shield 250. The outer surface of anode 256 is coated with a layer 257 of zirconium hydride containing the isotope deuterium and a lug 258 fixed to the upper end of the anode provides the means for making an electrical connection thereto. A helical heater filament 259 is supported adjacent the end of anode 256 by a pair of leads 260 and 261 which extend through respective ceramic insulators 262 and 263 fixed in respective openings diametrically positioned in heat shield 250. Leads 260 and 261 are directed to extend along the outer wall of the heat shield and pass through respective ceramic insulators 264 and 265 in plate 19.

An electrical circuit for associating the deuterium source of FIG. 7 with the neutron generator shown in FIGS. 1A and 1B is ilustrated in FIG. 8. Filament 259 is connected to the secondary winding of a step-down transformer 266 having its primary winding connected to alternating-current leads 109, 110. To place the variable impedance presented by the pressure control circuit 145 in series with the diode 256, 259, one terminal of circuit 145 is connected to lead 109 and the other by lead 148 and lug 258 to anode 256 of the deuterium source. The anode-cathode circuit for diode 256, 259 is completed by a connection 267 extending from filament lead 260 to power lead 110.

In operation, filament 259 is heated to a given operating temperature and the anode-cathode current of device 256, 259 is dependent upon the impedance presented between leads 147 and 148 of the pressure control circuit 145. Since this impedance is responsive to the pressure-control potential on lead 144, it is obvious that the anode-cathode current of device 256, 259 is dependent upon the pressure-control potential. When the gas pressure within the envelope under control decreases, the impedance between leads 147 and 148 decreases, thereby increasing the anode-cathode current of the deuterium source. As a result, anode 256 is heated to a temperature at which layer 257 emits deuterium. Conversely, an increase in pressure causes the anode-cathode current of device 256, 259 to decrease, anode 256 drops in temperature and the amount of deuterium issuing from layer 257 decreases. Thus, automatic pressure control is obtained.

Although device 256, 259 has been shown in association with a source of alternating anode-cathode potential, a unidirectional potential may be employed for this purpose. In that event, pressure control circuit 145 is arranged to present a variable resistance between leads 147 and 148 that is responsive to the pressure-control potential.

Obviously, a control grid (not shown) may be interposed between cathode 259 and anode 256 of the deuterium source. For such a modification, a fixed potential is applied between anode 256 and cathode 259, and pressure control circuit 145 is suitably arranged to control the potential between the cathode and the grid, thereby to adjust the anode-cathode current in a well-known manner.

An alternative diode-type deuterium source is shown in FIG. 11 which may be operated in the same manner as the diode reprsented in FIG. 7. The alternative structure comprises a metallic, cylindrical envelope 268 supported in spaced parallel relation to plate 19 and provided with end caps 269 and 270 constructed of an electrically insulating material, such as a ceramic. A helical heater filament 271 extends coaxially within envelope 268 and is supported by a pair of leads 272 and 273 which extend through end caps 269 and 270, respectively, and pass through respective ceramic insulators 274 and 275 in plate 19. Another lead 276 extends through a ceramic insulator 277 in plate 19 and is soldered or welded to the exterior surface of metallic envelope 268. A layer 278 of zirconium hydride containing the isotope deuterium is coated about the interior surface of envelope 268 and a plurality of openings 279 and 280 are provided in end caps 269 and 270, respectively.

The deuterium source of FIG. 9 operated in substantially the same manner as does the source shown in FIG. 7, and it may be used in association with the circuit illustrated in FIG. 8.

If desired, an electrolytic cell similar to the one represented in FIG. 2B may be utilized as a deuterium source. To that end, such a cell (not shown) may be mounted within section 21 of the envelope portion illustrated in FIG. 2A and provided with an electrolyte including the isotope deuterium. By controlling the potential applied to the electrodes, the current through the cell and the resulting electrolysis may be regulated thereby to adjust the amount of deuterium generated and diffused through a suitably constructed metal wall portion of the deuterium source.

In FIG. 10 there is illustrated another form of neutron generator suitable for use in the apparatus of FIGS. 1A and 1B, and represented, in part, schematically. The generator comprises a hollow, cylindrical envelope constructed of a metal, such as chrome-steel and having an upper, integral metallic cap 286. Its lower end is closed by an electrical insulating plug 287 which may be of a ceramic material sealed to the inner wall of the envelope. A metallic partition 288 divides the interior of the generator into an upper compartment 289 and a lower compartment 290.

A deuterium source 291 is supported within compartment 289 by a pair of leads 292 and 293 which extend through suitably sealed insulators in upper end 286 of the generator envelope. Source 291 may be of the type illustrated in FIG. 6 and made large enough in capacity so as to operate automatically to provide an equilibrium pressure of deuterium gas within envelope 285.

Partition 288 is provided with a plurality of openings 294 and a metallic baffle plate 295 is supported above partition 288 so as to shield source 291 from any particles, such as ions, which may traverse openings 294.

A pair of leads 296 and 297 extending through ceramic closure 287 support a hollow, cylindrical electrode 298 coaxially within compartment 290. The upper end of electrode 298 is closed and it is provided with a plurality of openings or perforations 299 distributed about the entirety of its cylindrical wall and upper closure. Another pair of leads 300 and 301 which extend through ceramic closure 287 are connected to the ends of a filament wire 302 of U-shaped configuration. The bight portion of filament 302 passes through an opening 303 in a ceramic support 304 which is received by an opening 305 in the upper end of electrode 298.

The inner wall of envelope 285 within compartment 290 is coated with a layer 306 of zirconium hydride containing the isotope tritium and the envelope is evacuated and filled with deuterium gas at the required pressure.

The filament portion of deuterium source 291 is heated by a battery 307 connected to leads 292 and 293 and a high voltage source 308 which develops a potential in the neighborhood of 50 kilovolts between a negative lead 309 and a positive lead 310 provides the accelerating voltage for the generator. Of course, a higher accelerating potential, say 100 kilovolts, may be employed, if desired. Negative lead 309 is connected to metal envelope 285 and is grounded at 311. Obviously, point 311 may be a point on the metal housing 13 of the generator illustrated in FIGS. 1A and 1B. Positive lead 310 is connected to lead 296 and thus is connected to electrode 299. A voltage divider 312 is shunted across leads 309 and 310 and is provided with a tap 313 connected to filament lead 300. Tap 313 is arranged to provide a voltage of approximately 150 volts relative to lead 310. A filament battery 314 is connected to filament leads 300 and 301.

Although the energizing circuit for the neutron generator of FIG. 10 is illustrated schematically, it is to be understood that the generator may be readily incorporated in the circuit shown in FIGS. 1A and 1B.

In operation, battery 314 heats filaments 302 to its electron-emitting temperature and since electrode 298 is at a positive potential with respect to filament 302, electrons are drawn toward it. These electrons experience ionizing collisions with molecules of deuterium and a continuous ionic discharge takes place within electrode 298. Since metal envelope 285 is at a negative potential relative to electrode 298, electrons are repelled and are not drawn toward the envelope. Consequently, ionization does not occur in the space between electrode 298 and envelope 285.

Some of the ions produced within electrode 298 pass through openings 299 and are accelerated toward the inner surface of envelope 285. These ions strike layer 306 with sufficient velocity to effect deuterium-tritium reactions in which neutrons are derived.

As explained in connection with FIG. 6, deuterium source 291 operates to maintain a given deuterium pressure within compartment 289 and since this compartment communicates with compartment 290 via openings 294, the selected deuterium pressure is maintained within the ion source defined by filament 302 and electrode 298, as well as within the accelerating gap defined by electrode 298 and envelope 285.

Of course, if desired, a suitable pressure-measuring device similar to the one shown in FIG. 2A may be associated with the neutron generator of FIG. 10 and employed to regulate the temperature of deuterium source 291.

An alternative arrangement for energizing filament 302 may comprise a generator connected to leads 300 and 301. The generator is mechanically connected to a driving motor by an electrical insulating coupling designed to withstand the accelerating potential of 50 kilovolts. Thus, the motor may be energized by the potential available at the alternating current supply leads in housing 13 (FIGS. 1A and 1B), and yet it is electrically isolated from the high potential difference existing between filament 302 and the housing. This general type of filament supply circuit is shown in greater detail in the aforementioned application of Wayne R. Arnold.

Referring now to FIGS. 11–13, there is shown a neutron generator 320 in accordance with the present invention comprising a sealed envelope characterized by a source section 321 and an accelerating gap section 322. A source of ionizable gas and means for ionizing such gas are in the source section and electrodes are in the accelerating gap section for establishing a high voltage gradient to direct positive ions from the source section toward a target 323.

Considering first the source section 321 of the neutron generator, there are provided electrically conductive, ferromagnetic front and rear cathodes 325, 326 respectively of generally disc-like configuration with central portions 327 and 328 extending axially toward one another to provide confronting flat, parallel cathode surfaces 329 and 330, respectively. While the cathodes 329, 330 are preferably of the same diameter, the front cathode 325 has a central bore 332 extending through it from the cathode surface 329 to its flat, circular front face 333. Such bore 332 preferably has an outlet flared from a diameter substantially greater than the desired diameter of ion beam to be projected toward target 323 so as to permit free circulation of ionized and unionized atoms and molecules of gas between the source and accelerating gap sections of the envelope for establishment of a substantially uniform gas pressure therethrough. The respective cathodes 325, 326 may be made of any suitable conductive, ferromagnetic metal, nickel being preferred.

To enclose the volume between the cathodes 325, 326, a thin cylindrical portion 321a of the envelope, conveniently of equal diameter with the rear cathode 326 but of smaller diameter than the front cathode 325, extends in sealed relation between such cathodes adjacent their peripheries. For convenience of assembly and accurate positioning of the cathodes with respect to the cylindrical portion and to one another, the cathodes have their confronting faces relieved to define annular shoulders 335, 336 of diameter equal to the internal diameter of the cylindrical portion for a snug fitting reception thereof. The end openings of the cylindrical envelope portion 321a may then be sealed or brazed in abutting relation with the respective cathodes, thus rendering this envelope section vacuum tight. The initial vacuum may be drawn through exhaust tubulation 338 sealed as by brazing in outwardly extending relation with respect to the rear cathode 326 and, specifically, an exhaust port 339 therethrough, the tubulation 328 then being pinched off, as shown, to close the sealed vacuum system within the envelope.

In a preferred form of this neutron generator, its envelope encloses an atmosphere comprising equal parts of deuterium and tritium at a pressure regulated at a desired value, for example, one micron for steady state production of neutrons and a somewhat higher value such as ten to twenty microns for pulsed operation. While a variety of sources may be employed to obtain the desired gaseous atmosphere within the envelope, the type shown in FIGS. 1A and 1B is conveniently employed and may comprise filament 340 constructed, for example, like filament 233 of FIGS. 4 and 5 mounted in parallel relation with the axis of the source section envelope portion 321a within a tubular heat shield 341. The rear end of shield 341 may be received in a counterbore 342 in the forward face of rear cathode 326 so as to be supported from such cathode with its forward end spaced from the rear face of front cathode 325 to minimize heat transfer to the front cathode. While the forward end of filament 340 is suitably grounded, the rear end is connected to a lead-in conductor 343 extending through bore 344 of rear cathode 326 and supported in an insulating terminal 345, which may be of standard commercial design having a gas-tight, brazed interfit in the bore 343.

To ionize deuterium and tritium gas released from occlusion on filament 340 by passage of heating current therethrough, the source section 321 further includes a thin cylindrical anode 346 supported coaxially within envelope portion 321a and extending in overlapping relation between the confronting cathode surfaces 329, 330 so as generally to enclose the region therebetween. While the diameter of anode 346 is sufficiently small to provide spaced clearance with respect to the heat shield 341 for filament 340, it is larger than the diameter of cathode extensions 327, 328 and sufficiently large to permit establishment of relatively long total paths of electron travel within such region relative to the mean free path for such electrons. As in the case of the gaseous discharge device described in connection with FIG. 2A, provision is made for establishing an axial magnetic field between the cathode surfaces 329, 330 and within the annular anode electrode.

In order that the gas pressure within the envelope may be maintained as low as possible and yet permit efficient ionization, it is desirable that the field strengths within anode 346 be as high as possible, yet be established by a permanent magnet rather than an electromagnet to minimize power requirements. To this end, a permanent magnet 348 in the form of a magnetic annulus or cylinder is mounted in surrounding relation to the envelope portion 321a so as to extend in flux linking relation with the respective ferromagnetic cathodes 325, 326. In particular, front cathode preferably has a flat annular outer face 349 abutting the forward end of magnet 348 and an annular shoulder 350 extending a short distance rearwardly therefrom snugly to receive the forward end of magnet 348 thereabout. Preferably the bore of magnet 348 is of uniform diameter sized to snugly receive the periphery of back cathode 326, as well as shoulder 350 of front cathode 325; in addition, it may have a closely fitted relation with the periphery of envelope portion 321a so as to promote efficient heat dissipation from the region of filament 340 outwardly through the magnet.

Of course, there is gas communication between filament 340 via the forward end of heat shield 341 and the respective ends of anode 346.

To afford a proper support for anode 346 in this relationship, a support wire 350 is supported in a terminal bushing 351 from the forward face of back cathode 326 in insulated relation and is secured, as by spot welding, to the periphery of the anode 346. At a diametrically opposite point on the periphery, lead-in wire 353 may likewise be secured to anode 346 for proper support thereof, at the same time serving to apply a suitable positive potential with respect to cathodes 325, 326 which conveniently are at ground potential. To received lead-in wire 353 in insulated relation, back cathode 326 has a further hole 355 therethrough fitted with a brazed terminal bushing 356 which may be similar to terminal bushing 344. Thus, it may be seen that back cathode 326 serves as a base for a header sub-assembly including the shielded filament 340 and anode 346 for ready assembly with the front cathode 325 in accurately positioned relation thereto through the connection afforded by cylindrical envelope portion 321a. At the same time the header or back cathode comprises part of the envelope enclosing the gaseous atmosphere of heavy hydrogen isotopes to provide a sealed tube.

Turning next to the accelerating gap section 322 of the neutron generator tube, there are provided a pair of cylindrical envelope portions 322a and 322b composed of a suitable insulating material such as ceramic tubing, and together extending substantially the length of the enclosed portion of the accelerating gap section. The longer or main portion 322a is sealed at one end to the periphery of the front cathode 325, for example, by carrying a Kovar band 355 in sealed relation about such end which, in turn, is brazed to the cathode periphery. The front cathode may be relieved inwardly from this brazed connection with the envelope portion 322a as shown at 356 for convenient assembly with minimum risk of voltage breakdowns.

At the other end of envelope portion 322a, a sealed connection with portion 322b is effected, at the same time affording an electrical connection extending radially between them for application of a high negative potential to a suppressor electrode 358. For this purpose, a ring member 359 composed, for example, of Kovar has oppositely directed peripheral flanges receiving the endwise peripheries of the envelope portions 322a and 322b to form a smooth continuation of their uniform cylindrical profile and has an axial flange 360 supporting a thin-walled conductive tube 361 which, in turn, is received within the axial portion 362 of cup-like suppressor electrode 358. Ring member 359, therefore, not only affords a gas-type supporting connection between ceramic envelope portions 322a and 322b but also provides an electrical lead-in connection from its periphery via its web portion which abuts the adjacent end of envelope portion 322a thence along the length of suppressor support tube 361 to the suppressor electrode 358 proper, holding this metallic path including both the tube and the electrode in inwardly spaced relation out of contact with the bore of the main ceramic envelope portion 322a. The length of support tube 361 is such as to position the planar, effective portion 358a of suppressor electrode 358 in parallel relation to the flat face 333 of front cathode 325 and spaced therefrom in accordance with the desired length of the accelerating gap and the optics involved in directing the ion beam to the target, while minimizing or suppressing the travel of secondary emission electrodes from the target 323 toward the ion source. For example, the spacing between the suppressor and the front cathode may be ½ inch while the total gap from front cathode to target surface is ⅞ inch, the suppressor having a central aperture 358b which may, for example, have a diameter of 3/16 inch where the expected beam diameter is of the order of one to two millimeters.

Because the suppressor electrode typically is operated at a more negative high voltage than the target, a substantial and preferably uniform coaxial spacing is provided between the suppressor electrode 358 (in assembly with supporting tube 361) and conductive target rod 365 (which provides at its flat inner end the base for target 323). This coaxially spaced relationship is obtained by sealed (e.g., brazed) connection of an annular end cap 366 between the insulating spacer portion 322b of the envelope and the shank of rod 365. For example, cap 366 may have an axial flange receiving the end of envelope spacer portion 322b in sealed relation and in the same manner that the opposite end is received by the axial flange of ring member 359. On the other hand, cap 366 may have aperture 367 snugly receiving the target rod shank with an enlarged portion 368 of such shank shouldered against the exterior face of the cap.

The target rod 365 must not only serve to provide a high conductivity electrical path for application of high voltages (e.g., about 50–150 kilovolts) to the target but preferably also a high thermal conductivity for removing the heat of reaction from the vicinity of target 323 to a suitable heat sink (not shown) exterior to the envelope and generally along the path of connection to the high voltage power supply. Hence, the target rod is preferably composed of a metal such as copper. While the target on the inner end of the rod 365 may be a coating of a suitable hydrogen occluding material such as zironium or other transition metal loaded with a heavy hydrogen isotope such as tritium, it has been found preferable, under considerations of ready processing of the neutron generator for obtaining high yields, to utilize a thin (i.e., about $5 \times 10^{-4}$ cm.) graphite or carbon coating as the target 323. A pure form of carbon such as Aquadag (a colloidal aqueous suspension of pure graphite) may be employed in preparing the coating. Such target then absorbs tritium, deuterium, or a mixture of both, by impaction during initial and continued operation of the neutron generator. One particular advantage of such target is its capability of withstanding high temperatures and its ability to operate for long periods without depletion or significant reduction in neutron flux yield.

In a typical operation of the neutron generator of FIGS. 11–13, a high positive voltage is first applied to target rod 365 (hence, to suppressor 358) with respect to the grounded front and back cathodes 325, 326, whereupon positive voltage is applied to anode 346 of the ion source. Heating current is next passed through filament 340 via lead-in wire 343 to raise the filament temperature to a value corresponding to a desired operating pressure, for example, one micron of mercury. Adjustment of the anode voltage then leads to establishment of the desired ion beam current and a consequent generation of a neutron output flux by reaction of deuterium ions (deuterons) with tritium in the target. While the deuteron or tritium reaction predominates, neutron production may also result from reaction of accelerated triton with deuterium retained in the target, and to a lesser extent lower energy neutrons may result from deuteron-deuterium reactions at the target. Suitable controls for the filament temperature, ion source anode voltage and accelerating gap voltage may be utilized, as referred to heretofore so that reliable operation over long periods may be obtained whether in a laboratory environment or under the rugged conditions and high temperatures prevailing in applications of the neutron generator to radioactivity well logging. Because the neutron generator has a cylindrical configuration with a diameter at the magnet 348 of, say, two to four inches and a substantially lesser diameter of, say, 1¼ inch along the accelerating gap section, the neutron generator may readily be accommodated in a conventional pressure housing such as is typically employed in well logging, and with adequate clearance in the region of application of high voltages, that is, at contact ring member 359 and at the external end of the target rod.

In order that the neutron generator may present a minimum load on the high voltage supply for the accelerating gap whereby such supply may be of sufficiently simple design as to be accommodated readily in a borehole instrument, the suppressor 358 is conveniently at, say, 600 to 800 volts positive with respect to the target. While such suppressor voltage can be derived in any convenient way from the high voltage source, where the ion beam current is regulated for substantially constant neutron flux output, the suppressor may be connected to the target via a dropping resistor through which the target current passes and sized to give the desired voltage difference.

A further improvement may be obtained with a modified form of suppressor consisting of a very transparent grid mesh or foraminous construction leaving a central aperture through which the well-defined ion beam may pass but effective to provide an electric field gradient thereabout to minimize secondary electron travel toward the ion source. Likewise, if desired, one or more electrodes may be utilized in the manner described, for example, in S. Soloway Patent No. 2,967,245, issued January 3, 1961, to spread the ion beam more diffusely over the target surface for purposes of lowering target temperature, thereby to increase its gas holding ability and the consequent efficiency of neutron production. It is noteworthy that in attaining the rugged, composite metallic-ceramic construction which characterizes the envelope of this neutron generator, only seven joints need be brazed to effect a vacuum-tight seal of the envelope, the remaining joints being standard Kovar-ceramic seals. It may also be noted of significance that the configuration of the source section of the envelope exactly determines the position of the permanent magnet 348 so that no critical adjustment of it is required to obtain uniform magnetic field conditions within the anode-cathode region of the ion source on a production basis. In addition, the conductive but non-magnetic envelope portion 321a of the source section 321 not only assures uniform grounding of the electrically connected cathodes 325, 326 but also affords ready heat transfer radially outward from the source section to the surrounding magnet without shunting the magnetic field established by the magnet. To this end, envelope portion 321a may suitably be composed of stainless steel or the alloy Monel.

To the extent that secondary electrons escape from the target or suppressor and return through the probe portion 327 of the front cathode, they will tend to strike the rear cathode surface 330 energetically to release additional secondary electrons tending to enhance the ionization of the gas within the ion source. Their impingement on the back cathode surface 330 will also be accompanied by release of heat tending to flow radially of the back cathode 326 and into the rear end of the magnet 348 as well as into the heat shield 341 for filament 340. While the consequent tendency to raise the temperature of the filament 340 relieves somewhat the requirements for heating current from the power supply, it also has a tendency toward developing an instability since increased temperature leads to increased pressure and, in turn, to increased numbers of secondary electrons striking the back cathode. Such problem is thus minimized by efficient transfer of heat radially outwardly. If desired, one or both of the front and back cathodes, or their central extensions, may be permanently magnetized, as are ferromagnetic members 61, 64 of FIG. 2A having pole piece cathodes 54, 55, rather than annular member 348.

A somewhat different accelerating gap section is employed in neutron generator 370 of FIG. 14, along with a source section slightly modified in relation to the embodiment of FIGS. 11-13. For example, in source section 370a, filament 340 is here supported at its forward end by attachment to front cathode 325'. A simplified insulating bushing 371 is shown for rear lead-in wire 372 to filament 340 but a terminal bushing such as 344 (FIG. 12) may of course be employed. In this embodiment, no heat shield is shown although one may be employed, if desired.

Other portions of the source section 370a are identified by primed numerals corresponding to the description in conjunction with FIGS. 11-13, where minor structural variations are present. Like the source section of FIGS. 11-13, the source section 370a provides a closed and enclosing magnetic circuit via magnet 348 and cathodes 325', 326' establishing a high magnetic field intensity in the ionization region, yet substantially a zero magnetic field in the accelerating gap.

Turning now to the accelerating gap section 370b, there is provided a generally hemispheric gap between a modified suppressor or accelerating electrode 374 and the front ion source cathode (or probe electrode) 325' taken with the electrically connected thin-walled metallic envelope portion 375 which extends coaxially of the suppressor. In consequence, the electric field gradients in the gap may be more nearly uniform and linear along generally radial lines. The envelope portion 375, at one end, may be sealed by brazing to the front cathode 325'. At its other end envelope portion 375 may have a sealed connection with a high voltage insulator 377 composed, for example, of a suitable ceramic. Extending in sealed relation through the bore of insulator 377 is a conductive sleeve 378 which supports suppressor electrode 374 in proper position as well as affording an electrical connection for high voltage applied to it. A cylindrical insulator 379 fitted in sealed relation within sleeve 378 receives, in turn, a modified target rod 365', in this case having a target surface 380 beveled at, say 45°. The seal between target rod 365' and insulator 379 may actually be effected by a flared ring 382 of Kovar, for example, brazed to the rod and overlapping the end of the insulator in sealed relation. By leaving a suitable gap between the ring 382 and the sleeve 378 along cylindrical insulator 379, sufficient insulation may be provided for maintaining the suppressor at a potential of 400-800 volts more negative than the target, for example.

Since the metallic envelope portion 375 surrounding the gap is preferably at ground potential and, in any event, at a high positive voltage with respect to the target and suppressor, insulator 377 may be provided with an extended leakage path by nested skirtings 384. In order that this high potential difference will result in a minimum of secondary electron or field emission flow toward the ion source, the generally cylindrical periphery of the suppressor 374 extends smoothly into an inwardly rounded end converging to a reduced diameter aperture 385 sized to freely pass a diverging beam from the ion source directed toward target 380. Hence, the overall configuration of suppressor 374 approximates a hemispheric profile, avoiding any sharp edges and attendant high field intensities. A suitable metal for suppressor 374 is, for example, stainless steel, while sleeve 378 and envelope portion 375 may each be composed of Kovar, for example.

The operation of the neutron generator of FIG. 14 is essentially similar to that of neutron generator 322 but may be further characterized by a freedom from collection of charges on the interior of envelope portion 375 surrounding the gap due to its metallic composition, in contrast to a use of glass or a ceramic.

Where it is desired to minimize the heat exchange relationship between the filament 340 and the ion source, a form of neutron generator 386 as shown in FIG. 15 may suitably be employed having a modified source section 387 and corresponding envelope portion 387a. Apart from employment of a target rod 388 and transverse target surface 389 generally like that of FIG. 12, the accelerating gap section is like that of FIG. 14.

In this modified neutron generator 386, the source section 387 includes a rearwardly extending can-like filament assembly 390 including a ceramic header 391 sealed across the rearward opening of cylindrical metallic heat shield 392, here forming part of the envelope portion 387a. Extending forwardly from the inner wall of the header 391 is a rigid screen cage 394 of cylindrical configuration closed at its other end short of modified back cathode 326" by support plate 395, to the center of which the forward end of the filament is secured. Header 391 is apertured to receive a conventional insulator bushing 397 for lead-in wire 343, as well as the pinched-off exhaust tubulation 338. With the forward end of heat shield 392 received in the circular recess of the rear face of back cathode 326" and brazed thereto, gas exchange between the filament and the ion source is obtained via the screen cage 394 and spaced ports 397 extending through the back cathode radially of the central extension 328.

Considering now the ion source for neutron generator 386, the front cathode 325″ is essentially like that of FIG. 12 except in having a forwardly flared aperture 332′ for the ion beam. Similarly, the back cathode 326″ is substantially the same except for the different accommodation of the filament, heat shield and exhaust tubulation and for the provision of spaced radial arcuate flanges 400 thereof, about which the permanent magnet 348 is received and positioned. While a flux path is thus completed through the arcuate flanges 400, the resulting space between the bore of the magnet 348 and the periphery of source section 387 accommodates a lead-in wire 401 for application of positive potential to the anode 346 via a conductive, metallic support ring 402. The support ring 402 has an axially enlarged central portion which may be spot welded to the anode 346 received therethrough, and axial flanges at its periphery for sealing with cylindrical ceramic spacers 403, 404, in turn sealed in supporting relation to the front and back cathodes by Kovar rings 405, 406, respectively. By this sectional construction, support ring 402 may be centered in parallel relation between the cathodes to properly positioned anode 346 in the manner described in conjunction with FIG. 12.

The operation of the neutron generator 386 of FIG. 15 is also essentially similar to that of generator 322 of FIGS. 11–13.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

I claim:

1. A gaseous discharge device comprising an envelope containing an ionizable gas and having oppositely disposed openings; a pair of electrically-conductive magnet members each received by one of said openings and having confronting surfaces defining cathode electrodes for said device, said magnet members being disposed in magnetic aiding relationship to provide a magnetic field transverse to said surfaces; means for maintaining a gas-tight relationship between said magnet members and said openings; and an anode electrode supported within said envelope between said surfaces and within the influence of said magnetic field.

2. A gaseous discharge device comprising an envelope containing an ionizable gas and having oppositely disposed openings; a pair of electrically-conductive magnetic members each received by one of said openings and having confronting surfaces spaced within said envelope and defining cathode electrodes for said device, a magnetic annulus surrounding said envelope and having opposite portions disposed in flux linking relation to the respective magnetic members to provide a flux path therewith, said magnetic members being sealed to said envelope in gas-tight relationship at said openings; and an annular anode electrode supported within said envelope between said surfaces and within the influence of the magnetic field between said magnetic members.

3. A neutron generator including ionization means comprising a cylindrical member composed of non-magnetic material and having oppositely disposed openings, a pair of paramagnetic members each received by one of said openings and having electrically-conductive confronting surfaces spaced within said cylindrical member and defining cathode electrodes for said ionization means, a magnetic annulus surrounding said cylindrical member and having opposite portions disposed in flux linking relation to the respective paramagnetic members for providing a flux path therewith which results in a relatively strong magnetic field extending between said confronting surfaces, said paramagnetic members being sealed to said cylindrical member in gas-tight relationship at said openings for containing an ionizable gas, and an annular anode electrode supported within said cylindrical member coaxially between said paramagnetic members to encircle a region within the influence of said magnetic field.

4. A neutron generator including ionization means comprising a cylindrical member composed of non-magnetic material and having oppositely disposed openings, a pair of paramagnetic members each received by one of said openings and having electrically-conductive confronting surfaces spaced within said cylindrical member and defining cathode electrodes for said ionization means, a cylindrical permanent magnet surrounding said cylindrical member and having its opposite end portions disposed in flux linking relation to the respective paramagnetic members for providing a flux path therewith which results in a relatively strong magnetic field extending between said confronting surfaces, said paramagnetic members being sealed to said cylindrical member in gas-tight relationship at said openings for containing an ionizable gas, and a cylindrical anode electrode supported within said cylindrical member coaxially between said paramagnetic members to encircle a region within the influence of said magnetic field.

5. A neutron generator having a source section comprising envelope means containing an ionizable gas and having oppositely disposed openings, a pair of magnetic members each received by one of said openings and having electrically-conductive confronting surfaces spaced within said envelope means and defining cathode electrodes, a magnetic annulus surrounding said envelope means and having opposite portions disposed in flux linking relation to the respective magnetic members to provide a flux path therewith, said magnetic members being sealed to said envelope in gas-tight relationship at said openings, an annular anode electrode supported within said envelope means between said surfaces and within the influence of the magnetic field between said magnetic members, and a filament supported within said envelope means and composed of a material capable of absorbing and emitting said ionizable gas; and a target section including a target within said envelope means adapted to react with ions of said gas when a high potential is applied to said target, said target being supported within said envelope means in sealed relation with respect to said electrodes and said filament.

6. A neutron generator as defined in claim 5 wherein said filament extends axially of said magnetic annulus intermediate said annulus and said anode electrode.

7. A neutron generator as defined in claim 6 wherein said accelerating gap section has a diameter substantially less than said annulus.

8. A neutron generator including ionization means comprising a cylindrical member composed of non-magnetic material and having oppositely disposed openings, a pair of paramagnetic members each received by one of said openings and having electrically-conductive confronting surfaces spaced within said cylindrical member and defining cathode electrodes for said ionization means, at least one of said paramagnetic members being permanently magnetized, a magnetic annulus surrounding said cylindrical member and having opposite portions disposed in flux linking relation to the respective paramagnetic members for providing a flux path therewith which results in a relatively strong magnetic field extending between said confronting surfaces, said paramagnetic members being sealed to said cylindrical member in gas-tight relationship at said openings for containing an ionizable gas, and an annular anode electrode supported within said cylindrical member coaxially between said paramagnetic members to encircle a region within the influence of said magnetic field.

9. A gaseous discharge device comprising an envelope containing an ionizable gas and having oppositely disposed openings; a pair of tubes sealed to said openings and extending into said envelope toward one another; a pair of electrically-conductive members, each closing one of said tubes within said envelope, and having confronting surfaces defining cathode electrodes for said device; a pair of permanent magnets, each disposed in one of said tubes, in magnetic aiding relationship relative to one another to provide a magnetic field transverse to said surfaces; means for maintaining said magnets in electrical contact with said electrically-conductive members; and an anode electrode supported within said envelope between said surfaces and within the influence of said magnetic field.

10. A gaseous discharge device comprising an envelope containing an ionizable gas and having oppositely disposed openings; a pair of tubes sealed to said openings and extending into said envelope toward one another; a pair of electrically-conductive members, each closing one of said tubes within said envelope, and having confronting surfaces defining cathode electrodes for said device; an annular keeper ring of magnetic material receiving said envelope and having an opening aligned with each of said openings in said envelope; a pair of permanent magnets, each disposed in one of said tubes and extending through corresponding openings in said envelope and said keeper ring, in magnetic aiding relationship relative to one another to provide a magnetic field transverse to said surfaces; means for maintaining said magnets in electrical contact with said electrically-conductive members and with said keeper ring; and an anode electrode supported within said envelope between said surfaces and within the influence of said magnetic field.

11. A neutron generator comprising envelope means containing an ionizable gas composed of at least one heavy hydrogen isotope, an ion source in said envelope means for deriving ions of said hydrogen isotope, and a target having a target surface composed of a carbon coating on a base composed of electrically and thermally conductive material, said target surface being spaced within said envelope means from said ion source by an ion accelerating gap so as to be impacted by said ions.

12. A neutron generator as defined in claim 11 wherein said carbon coating has a thickness of about $5 \times 10^{-4}$ centimeters.

13. A neutron generator as defined in claim 11 wherein said coating contains a quantity of an impacted heavy hydrogen isotope reactive with accelerated ions of said gas to produce neutrons.

14. A neutron generator as defined in claim 11 wherein said gas comprises approximately equal quantities of deuterium and tritium and each of said hydrogen isotopes is impacted by acceleration of ions thereof from said ion source against said target in pulses of relatively short duration.

References Cited by the Examiner
UNITED STATES PATENTS

| | | | |
|---|---|---|---|
| 1,092,489 | 4/1914 | Kesselring | 313—330 X |
| 1,953,813 | 4/1934 | Matsushima | 313—330 |
| 2,769,096 | 10/1956 | Frey | 250—84 |
| 2,908,823 | 10/1959 | Ely | 250—84.5 |
| 3,020,408 | 2/1962 | Martin et al. | 250—84.5 |

FOREIGN PATENTS

| | | |
|---|---|---|
| 1,202,728 | 7/1959 | France. |

OTHER REFERENCES

Reifenschweiler, "Neutrons from Small Tubes," Nucleonics, December 1960, pages 69 to 71.

RALPH G. NILSON, *Primary Examiner.*

ARTHUR GAUSS, ARCHIE R. BORCHELT,
*Examiners.*